United States Patent
Ozawa (10) Patent No.: US 7,499,189 B2
(45) Date of Patent: Mar. 3, 2009

(54) PRINTING APPARATUS AND PRINT PROCESSING METHOD HAVING A FUNCTION OF ADMITTING PRINTING

(75) Inventor: Hisashi Ozawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 813 days.

(21) Appl. No.: 11/064,805

(22) Filed: Feb. 24, 2005

(65) Prior Publication Data

US 2005/0190396 A1 Sep. 1, 2005

(30) Foreign Application Priority Data

Feb. 27, 2004 (JP) ............... 2004-053822

(51) Int. Cl.
*G06K 15/00* (2006.01)
*G06F 17/30* (2006.01)
(52) U.S. Cl. .................... 358/1.14; 358/1.13
(58) Field of Classification Search ......... 358/1.1, 358/1.9, 1.13, 1.14, 1.15, 474, 402; 347/1, 347/111; 399/19, 130, 361
See application file for complete search history.

(56) References Cited

U.S. PATENT DOCUMENTS 7,131,133 B1 * 10/2006 Kawakura et al. ............ 725/25

2004/0114156 A1 * 6/2004 Azami ..................... 358/1.1

FOREIGN PATENT DOCUMENTS

JP 2000-177211 A 6/2000

* cited by examiner

*Primary Examiner*—Gabriel I Garcia
(74) *Attorney, Agent, or Firm*—Panitch Schwarze Belisario & Nadel LLP (57) ABSTRACT

What is disclosed is a printing apparatus consisting: a memory section for memorizing plural printing data, and a first admission information and a second admission information corresponding to each of plural printing data; a first admission information inputting section for inputting an admission information corresponding to the first admission information; a second admission information inputting section for inputting an admission information corresponding to the second admission information; an admission information managing section for outputting a command of indicating to perform a printing process of a prescribed print data contained in said memory section, in case where an admission information inputted by the first admission information inputting section accords with the first admission information, and where an admission information inputted by the second admission information inputting section accords with said second admission information; and a print processing section for performing a printing process based on the command.

16 Claims, 10 Drawing Sheets

PRINTING APPARATUS AND PRINT PROCESSING METHOD HAVING A FUNCTION OF ADMITTING PRINTING

BACKGROUND OF THE INVENTION

1. Field of the Invention

The present invention relates to a printing apparatus and a print processing method which perform a printing process, based on an instruction from a host device, and especially relates to a printing apparatus and a print processing method having a function of admitting printing, which admits a printing process based on admission information assigned in the instruction.

2. Description of Related Art

In a conventional art, a printing apparatus, for example, what is disclosed in JP2000-177211, receives a printing data from a host device such as a personal computer, and it performs a desired printing process based on the printing data. Moreover, in case where a printing process is performed by a printing apparatus having a function of admitting printing, which admits a printing process based on admission information assigned in the instruction sent from the host device; various printing jobs contained in a controller section of the printing apparatus, are presented at a presenting screen of an operator panel of the printing apparatus. Therefore, when an operator inputs a password corresponding to a job selected at the operator panel so as to send the password to the printing apparatus, if the password received from the host device accords with the password of the corresponding job, the printing apparatus performs a printing of a job contained and presented at the operator panel. For example, when the host device sends a printing data made by the host device with attaching an identifying code, the printing apparatus performs a printing process only of a specific printing data corresponding to the identifying code registered beforehand at the printing apparatus. Thereby, even when printing data are sent from unlimited host devices to the printing apparatus, the printing apparatus performs a printing process only of a specific printing data corresponding to the identifying code. Therefore, the printing information is kept secret when a printing is performed.

However, in the conventional printing apparatus having a function of admitting printing mentioned above, a printing might be admitted in case where a password inputted from a host device by the third party who sends the password to the printing apparatus had accidentally accorded with a password of a job registered in the printing apparatus. Therefore, protection of secret of printing information was weak. Moreover, in case where a password being used by a user had leaked out to a third party for some reason, a printing process was performed freely by the third party.

The present invention is made to solve the problem mentioned above and it aimed at providing a printing apparatus and a print processing method which perform a printing process with a function of admitting printing, based on a password received from a host device and based on information attached relating to the password.

SUMMARY OF THE INVENTION

According to one aspect of the present invention, there is provided (1) a printing apparatus having a function of admitting a printing process based on a piece of information inputted to admit printing; wherein the printing apparatus comprising: a memory section for memorizing plural printing data, and for memorizing a first admission information and a second admission information corresponding to each of said plural printing data; a first admission information inputting section for inputting an admission information corresponding to said first admission information; a second admission information inputting section for inputting an admission information corresponding to said second admission information; an admission information managing section for outputting a command of indicating to perform a printing process of a prescribed print data contained in said memory section, in case where an admission information inputted by said first admission information inputting section accords with said first admission information corresponding to said prescribed print data, and where an admission information inputted by said second admission information inputting section accords with said second admission information corresponding to said prescribed print data; and a print processing section for performing a printing process based on said command outputted from said admission information managing section.

(2) A printing apparatus having a function of admitting a printing process based on a piece of information inputted to admit printing; wherein the printing apparatus comprising: a memory section for memorizing plural printing data, and for memorizing a first admission information and a second admission information corresponding to each of said plural printing data; an admission information inputting section for inputting an admission information corresponding to said first admission information; an admission information generating section for generating an admission information corresponding to said second admission information; an admission information managing section for outputting a command of indicating to perform a printing process of a prescribed print data contained in said memory section, in case where an admission information inputted by said admission information inputting section accords with said first admission information corresponding to said prescribed print data, and where an admission information inputted by said admission information generating section accords with said second admission information corresponding to said prescribed print data; and a print processing section for performing a printing process based on said command outputted from said admission information managing section.

(3) A printing apparatus having a function of admitting a printing process based on a piece of information inputted to admit printing; wherein the printing apparatus comprising: a memory section for memorizing plural printing data, and for memorizing an admission information and an assigned printing time corresponding to each of said plural printing data; a clock section for obtaining a present time; an admission information inputting section for inputting an admission information corresponding to a prescribed printing data; an admission information managing section for outputting a command of indicating to perform a printing process of a prescribed print data contained in said memory section, in case where an admission information inputted by said admission information inputting section accords with said admission information corresponding to said prescribed print data, and where the present time obtained from said clock section accords with said assigned printing time corresponding to said prescribed print data; and a print processing section for performing a printing process based on said command outputted from said admission information managing section.

According to the printing apparatus (3), provided that a user assigns an assigned printing time and a password beforehand, a printing process is performed only when the user inputs the password at the assigned printing time. Thus, a double admission comprising a password admission and a time admission, is performed. Therefore, any third party cannot illegally perform a printing even if the third party input the same password.

(4) A printing apparatus according to the printing apparatus (3) comprising: a presenting section for presenting existence of print data in said memory section; wherein said admission information managing section comprising: an admission information presentation managing section for restricting presentation of existence of print data, based on said assigned printing time corresponding to each of said print data and the present time obtained from said clock section. According to the printing apparatus (4), existence of said print data presented at a presenting section is restricted based on an assigned printing time corresponding to each of said print data and the present time. Thereby, the admission information is never known by a third party. Therefore, any third party cannot illegally perform a printing even if the third party continuously input the same password.

(5) A printing apparatus according to the printing apparatus (3) wherein said admission information managing section comprising: a printing time monitoring section for informing an outer apparatus that the present time obtained from said clock section has come near said assigned printing time or has reached to said assigned printing time. According to the printing apparatus (5), when an assigned printing time that a user assigns comes or comes near, the admission information is informed to the user. Thereby, the user can perform printing, even if the user forgot the assigned time.

(6) A printing apparatus according to the printing apparatus (3) wherein said admission information managing section deletes said print data including said admission information when the present time obtained from said clock section has past said assigned printing time.

(7) A printing apparatus according to the printing apparatus (6) wherein said admission information managing section comprising: an assigned printing time monitoring section for informing an outer apparatus that the present time obtained from said clock section has past said assigned printing time, at a prescribed time before said print data including said admission information is deleted. According to the printing apparatus (7), by informing that the assigned printing time has past, before deleting the admission information, the user can perform printing, without sending the same admission information again.

(8) A printing apparatus according to the printing apparatus (7) or (3), (5) wherein said admission information managing section changes said assigned printing time. According to the printing apparatus (8), by changing the assigned printing time, before deleting the admission information, the user can perform printing, without sending the same admission information again.

According to another aspect of the present invention, there is provided (9) a print processing method for admitting a printing process based on a piece of information inputted in order to admit printing; wherein the print processing method comprising steps of: memorizing plural printing data, and a first admission information and a second admission information corresponding to each of said plural printing data; inputting an admission information corresponding to said first admission information; inputting an admission information corresponding to said second admission information; outputting a command of indicating to perform a printing process of a prescribed print data contained in a memory section, in case where an admission information inputted corresponding to said first admission information accords with said first admission information corresponding to said prescribed print data, and where an admission information inputted corresponding to said second admission information accords with said second admission information corresponding to said prescribed print data; and performing a printing process based on said command.

(10) A print processing method for admitting a printing process based on a piece of information inputted in order to admit printing; wherein the print processing method comprising steps of: memorizing plural printing data, and a first admission information and a second admission information corresponding to each of said plural printing data; inputting an admission information corresponding to said first admission information; generating an admission information corresponding to said second admission information; outputting a command of indicating to perform a printing process of a prescribed print data contained in a memory section, in case where an admission information inputted corresponding to said first admission information accords with said first admission information corresponding to said prescribed print data, and where an admission information inputted corresponding to said second admission information accords with said second admission information corresponding to said prescribed print data; and performing a printing process based on said command.

(11) A print processing method for admitting a printing process based on a piece of information inputted to admit printing; wherein the print processing method comprising steps of: memorizing plural printing data, and an admission information and an assigned printing time corresponding to each of said plural printing data; obtaining a present time from a clock section; inputting an admission information corresponding to a prescribed printing data; outputting a command of indicating to perform a printing process of a prescribed print data contained in a memory section, in case where an admission information inputted by said admission information inputting section accords with said admission information corresponding to said prescribed print data, and where the present time obtained from said clock section accords with said assigned printing time corresponding to said prescribed print data; and performing a printing process based on said command.

According to the print processing method (11), a printing process is performed only when the user inputs the password at the assigned printing time. Thus, a double admission comprising a password admission and a time admission, is performed. Therefore, any third party cannot illegally perform a printing even if the third party input the same password.

(12) A print processing method according to the print processing method (11) further comprising steps of: presenting existence of said print data; and restricting presentation of existence of said print data, based on said assigned printing time corresponding to each of said print data and the present time obtained from said clock section. According to the print processing method (12), the admission information is never known by a third party. Therefore, any third party cannot illegally perform a printing even if the third party continuously input the same password.

(13) A print processing method according to the print processing method (11) further comprising a step of: informing an outer apparatus that the present time obtained from said clock section has come near said assigned printing time or has reached to said assigned printing time.

(14) A print processing method according to the print processing method (11) further comprising a step of: informing an outer apparatus that the present time obtained from said clock section has past said assigned printing time before said admission information is deleted. According to the print processing method (14), by informing that the assigned printing time has past, before deleting the admission information, the user can perform printing, without sending the same admission information again.

DESCRIPTION OF THE PREFERRED EMBODIMENTS

First of all, an outline of a printing apparatus of the present invention will be described, in order to understand the invention easily. The printing apparatus of the present invention is characterized by having a function of admitting printing which admits a printing process based on validity of password inputted, when an assigned time of printing that a user assigned beforehand comes. In other words, in the present invention, a time of performing a printing, that is, a time of inputting or sending a password, is assigned beforehand. Thereby, the printing apparatus performs verification of a password only at a time assigned. And, in case where a password sent accorded with a password registered in the printing apparatus beforehand, the printing apparatus performs a printing process. In this way, a printing process of a printing apparatus is admitted based on two kinds of verification. Thereby, secret of the printing information to be printed by a printing apparatus is firmly secured. Incidentally, in Embodiments hereinafter described, a time to start printing is equal with a time assigned for printing.

Hereinafter, referring to the drawings, some Embodiments of printing apparatuses of the present invention will be described in detail. Incidentally, in the description hereafter offered, the same elements in different Embodiments are referred with the same symbols. And, duplication of description is omitted as possible.

Embodiment 1

The printing apparatus of Embodiment 1 performs printing only in case where a password is inputted or sent at a time assigned for printing, in a state that a user has assigned a time for printing beforehand, in order to prevent printing in case where a third party inputted or sent the same password as a user of the printing apparatus.

<Configuration>

Figure 1:
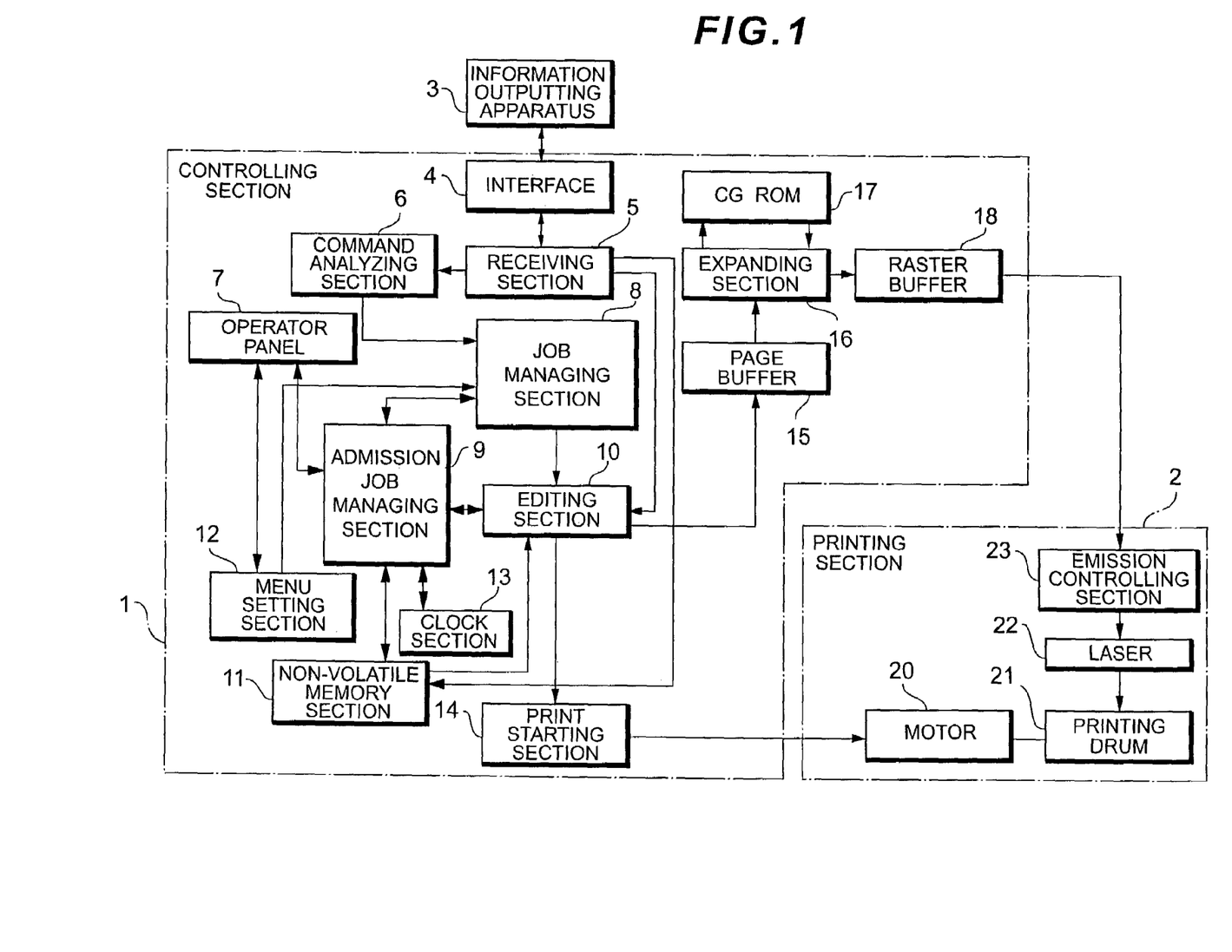
FIG. 1 is a block diagram showing a configuration of a printing apparatus of Embodiment 1.

FIG. 1 is a block diagram showing a configuration of a printing apparatus of Embodiment 1.

The printing apparatus in FIG. 1, comprises a controlling section 1 for performing a printing control, and a printing section 2 for performing a printing process. And, the controlling section 1 is connected to an information outputting apparatus 3 such as a personal computer etc. Incidentally, the information outputting apparatus 3 has a function of sending a printing data, and a name of job, a password, a time of printing etc. relating to the printing data.

Subsequently, a detailed configuration of the printing apparatus will be described. An interface 4 of the controlling section 1 is connected to the information outputting apparatus 3 of an outer device. And, in the inside of the controlling section 1, the interface 4 is connected via a receiving section 5 to a command analyzing section 6 for performing an analyzing process of a command etc. On the other hand, the interface 4 is connected via the receiving section 5 to an editing section 10 for performing an editing process of printing data. Incidentally, a command for setting circumstance for printing etc. is processed by the command analyzing section 6. On the other hand, printing data other than the command for setting circumstance for printing etc. is processed by the editing section 10.

The editing section 10 is connected with a job managing section 8 for managing print job information. Thereby, the editing section 10 refers to the managing print job information received from the job managing section 8. Then, the editing section 10 performs editing of a print data sent from the information outputting apparatus 3 such as a personal computer etc. Moreover, the editing section 10 is, as well, connected with an admission job managing section (admission information managing section) 9 for managing admission job information (that is, admission information), that is, information for performing an admission process. Thereby, the editing section 10 refers to the admission job information received from the admission job managing section 9. Then, the editing section 10 performs editing of a print data sent from a non-volatile memory section (memory section) 11.

The command analyzing section 6 is connected with the job managing section 8. Thereby, the command analyzing section 6 analyzes a print circumstance setting command received from the information outputting apparatus 3 via the receiving section 5, and it informs the job managing section 8 of job information etc. Moreover, the job managing section 8 is connected with a menu setting section 12 for performing setting a menu of a printing data. Thereby, it sends to the editing section 10 the job information received from the command analyzing section 6 and the printing data received from the menu setting section 12. Further, the job managing section 8 is connected with the admission job managing section 9. Thereby, it informs the admission job managing section 9 of the admission job information, in case where the admission job information is informed from the command analyzing section 6.

The admission job managing section 9 is connected with the non-volatile memory section 11. Thereby, it contains the admission job information in the non-volatile memory section 11, in case where the admission job information is informed from the job managing section 8. With this, it contains the printing data of the admission job information which has been received at the receiving buffer 5, in the non-volatile memory section 11. Moreover, the admission job managing section 9 is connected with the operator panel 7. Thereby, in case where a request for presenting admission job information is given by an operation at an operator panel, the admission job managing section 9 obtains a corresponding admission job name among admission job information which has been contained in the non-volatile memory section 11, and it is sent to the operator panel 7, where it is presented. Moreover, in case where a password corresponding to the admission job selected at the operator panel 7 is inputted, the admission job managing section 9 reads out from the non-volatile memory section 11 a password and a time assigned for printing corresponding to the selected admission job, when the name of the admission job selected at the operator panel 7 and the password are informed.

Subsequently, the admission job managing section 9 obtains the present time from a clock section 13. Then, it compares the obtained present time with the time assigned for printing corresponding to the inputted password. And, when the time assigned for printing corresponding to the inputted password accorded with the obtained present time, the admission job managing section 9 puts out to an editing section 10 an instruction for editing the admission job. Further, the editing section 10 performs editing of printing data with reading out the printing data in order from the non-volatile memory section 11.

Moreover, the editing section 10 is connected with the print starting section 14 for putting out a command of starting printing. And, the print starting section 14 is connected with a motor 20 of the printing section 2. Further, the editing section 10 is connected with an expanding section 16 for expanding bit map data. Moreover, the expanding section 16 is connected with a C. G ROM (Computer Graphics ROM) 17 for containing bit map data of printing letters. Further, the expanding section 16 is connected with a raster buffer 18 for containing temporarily raster image data expanded from bit map data.

The raster buffer 18 of the controlling section 1 is connected with the emission controlling section 23 of the printing section 2. And, the emission controlling section 23 is connected with a laser 22. Thereby, a control of quantity of emission of light is performed. And, the laser 22 performs printing to a print sheet on a print drum 21. Moreover, the drum 21 is driven by a motor 20, so as to send the print sheet.

<Operation>

Figure 2:
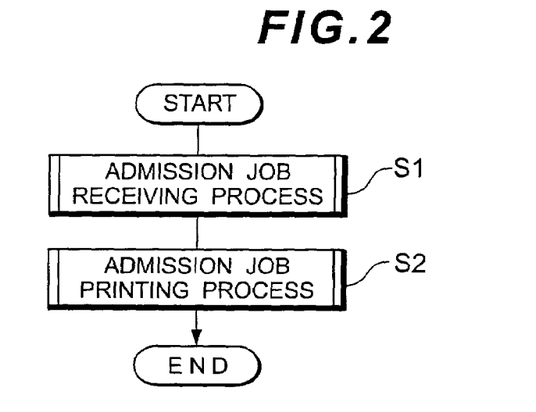
FIG. 2 is a flow chart showing a flow of overall process of admission job of a printing apparatus of each Embodiment.

Subsequently, referring to flow charts, a flow of admission process in a printing apparatus shown in FIG. 1 will be described. FIG. 2 is a flow chart showing a flow of overall process of admission job of a printing apparatus of each Embodiment. First of all, referring to FIG. 2, a flow of an overall process of admission job will be described. At first, in a controlling section 1 of a printing apparatus, a receiving buffer 5 receives an admission job from an information outputting apparatus 3 such as a personal computer etc. Then, the admission job is contained in a non-volatile memory section 11 (STEP S1). Subsequently, when a user inputted a password corresponding to the admission job at an operator panel 7, a printing section 2 performs a printing process of the admission job (STEP S2).

Figure 3:
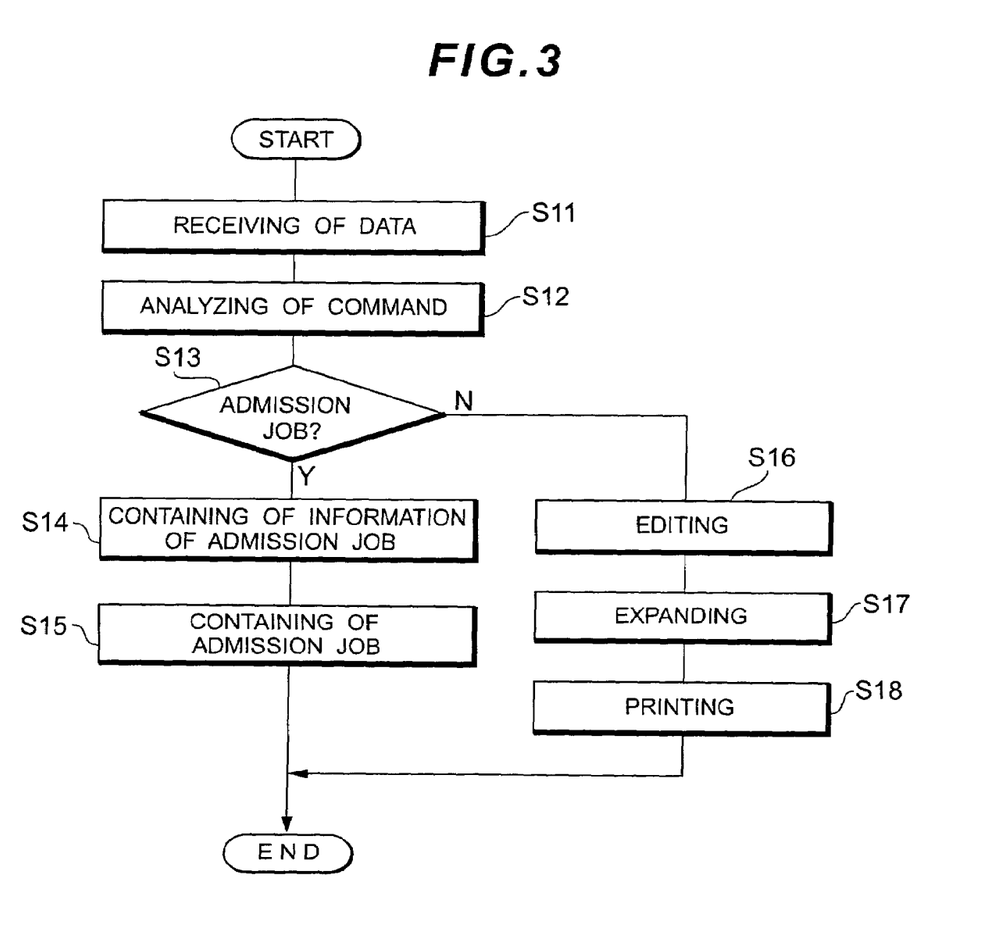
FIG. 3 is a flow chart showing in detail a flow of admission job receiving process at STEP S1 in FIG. 2.

Subsequently, a flow of a receiving process of the admission job of STEP S1 in FIG. 2 will be described in detail. FIG. 3 is a flow chart showing in detail a flow of admission job receiving process at STEP S1 in FIG. 2. At first, a receiving buffer 5 of a printing apparatus receives via an interface 4 a printing data sent from an information outputting apparatus 3 such as a personal computer etc. (STEP S11). Subsequently, a command analyzing section 6 analyzes a command of job information. And, the job information is sent to a job managing section 8 (STEP S12). Then, the job managing section 8 judges whether the received job information is an admission job or not (STEP S13).

Here, in case where the received job information is an admission job (in case of YES at STEP S13), the job managing section 8 informs an admission job managing section 9 of the job information obtained from the command analyzing section 6, that is, admission job information. Then, the admission job managing section 9 contains the admission job information including a name of the job, a password, a time of printing etc. in the non-volatile memory section 11 (STEP S14). Subsequently, the admission job managing section 9 puts out an indication to the non-volatile memory section 11, so as to contain the printing data of the admission job. Thereby, the non-volatile memory section 11 contains the printing data in itself, after it read out the printing data from the receiving buffer (STEP S15). Incidentally, the non-volatile memory to contain a printing data, is not limited to HDD (Hard Disk Drive) or flash memory etc.

On the other hand, in case where the received job information is not an admission job at STEP S13 (in case of NO at STEP S13), an editing section 10 edits a printing data received at the receiving buffer 5 so as to make an intermediate data based on the job information obtained from the job managing section 8. Then, the intermediate data is sent to a page buffer 15 (STEP S16). Further, an expanding section 16 expands the edited intermediate data to a raster image data via a page buffer 15. Then, the expanded raster image data is contained in a raster buffer 18 (STEP S17). And, the printing section 2 performs a printing process after it received the raster image data given from the raster buffer 18 (STEP S18).

Figure 4:
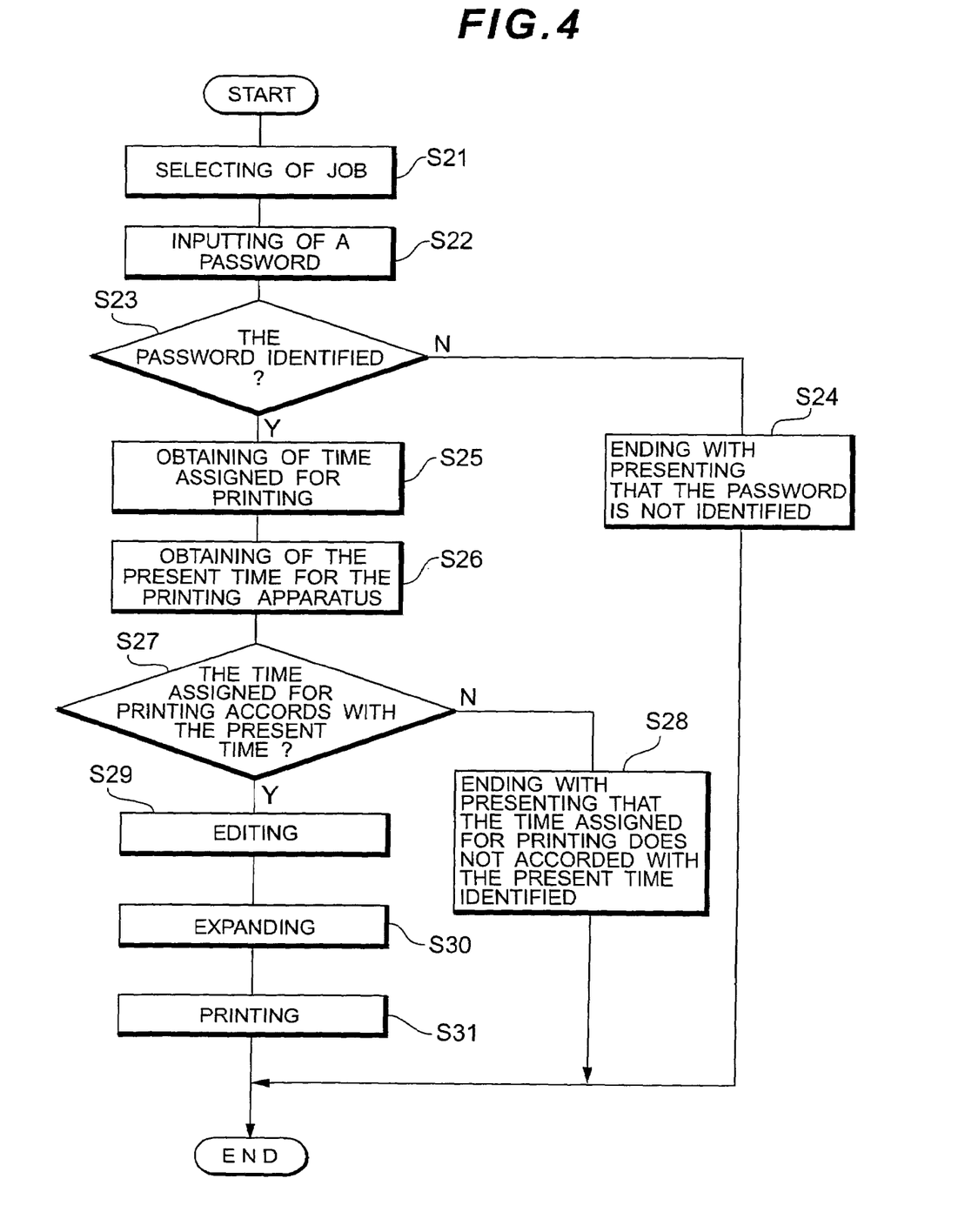
FIG. 4 is a flow chart showing in detail a flow of admission job printing process at STEP S2 in FIG. 2.

Subsequently, a flow of a printing process of the admission job STEP S2 in FIG. 2 will be described. FIG. 4 is a flow chart showing in detail a flow of admission job printing process at STEP S2 in FIG. 2. Here, a user selects the admission job at the operator panel 7. Then, the operator inputs a password. And, the printing section 2 performs a printing process. A flow of these steps will be performed.

First of all, a user operates the operator panel 7 so as to select the admission job. Then, name of the admission job selected by the user at the operator panel 7 is sent to the admission job managing section 9 (STEP S21). Subsequently, the user inputs a password corresponding to the admission job selected at the operator panel 7. Then, the inputted password is sent to the admission job managing section 9 (STEP S22).

Subsequently, the job managing section 9 obtains a password corresponding to the admission job selected from the non-volatile memory section 11. And, the job managing section 9 compares the password obtained at STEP S22 with the password inputted by the user (STEP S23). Here, in case where both passwords do not accord (in case of NO at STEP S23), the job managing section 9 informs the operator panel 7 that both passwords do not accord. And, the operator panel 7 presents that both passwords do not accord (STEP S24). Then, the process ends. It does not matter that the process ends without informing the operator panel 7 or without presenting at the operator panel 7.

On the other hand, in case where both passwords accord at STEP S23 (in case of YES at STEP S23), the admission job managing section 9 obtains a time assigned for printing corresponding to the admission job selected from the non-volatile memory section 11 (STEP S25). Further, the admission job managing section 9 obtains the present time from a clock section 13 installed in the printing apparatus (STEP S26). And, the admission job managing section 9 judges whether the time assigned for printing accords with the present time (STEP S27). Incidentally, the judgement whether the time assigned for printing accords with the present time, is performed by judging whether the time assigned for printing is included within a time range of a few minutes around the present time, or not. Moreover, this time range can be set intentionally at a menu set managing section 12.

Moreover, in case where the time assigned for printing and the present time do not accord (in case of NO at STEP S27), the job managing section 9 informs the operator panel 7 that both times do not accord. And, the operator panel 7 presents that both times do not accord (STEP S28). Then, the process ends. It does not matter that the process ends without informing the operator panel 7 or without presenting at the operator panel 7.

On the other hand, in case where the time assigned for printing and the present time accord (in case of YES at STEP S27), the admission job managing section 9 puts out an editing command to an editing section 10. Then, the editing section 10 edits a printing data received at the receiving buffer 5 so as to make an intermediate data based on the job information obtained from the admission job managing section 9. Then, the intermediate data is sent to a page buffer 15 (STEP S29). Further, an expanding section 16 expands the edited intermediate data to a raster image data via a page buffer 15. Then, the expanded raster image data is contained in a raster buffer 18 (STEP S30). And, the printing section 2 performs a printing process after it received the raster image data given from the raster buffer 18 (STEP S31).

<Effects>

As mentioned above, according to a printing apparatus of Embodiment 1, in case where an admission printing is performed by using a printing apparatus installed an admission printing function of allowing a printing process according to admission information, comparison of a time for assigning printing is performed when comparison of a password is performed. Therefore, when a user inputs a password, provided that a desired printing time is assigned, even if a third party tried to start printing with inputting password obtained illegally, the printing is not performed. Thus, by performing comparison of a time assigned for printing at comparison of a password in an admission printing, a printing system with high security of secret can be constructed.

Embodiment 2

In case of a printing apparatus of Embodiment 1 mentioned above, each admission job is presented at an operator panel 7, and existence of an admission job which needs admission is easily detected by a third party. Therefore, in case where the third party continued inputting or sending the corresponding password obtained illegally, there should be a case where a time assigned for printing set by a user accords with an assigned printing time. In this case, a printing process is illegally performed. Therefore, in a printing apparatus of Embodiment 2, to avoid this inconvenience, when a time assigned by a user came, the admission job is presented at the operator panel 7 for the first time, or the information of the admission job is replied to the job managing section 8 for the first time. Thereby, existence of the admission job cannot be detected by the third party. Therefore, the third party cannot input or send password continuously. And, printing is not illegally performed.

<Configuration>

Figure 5:
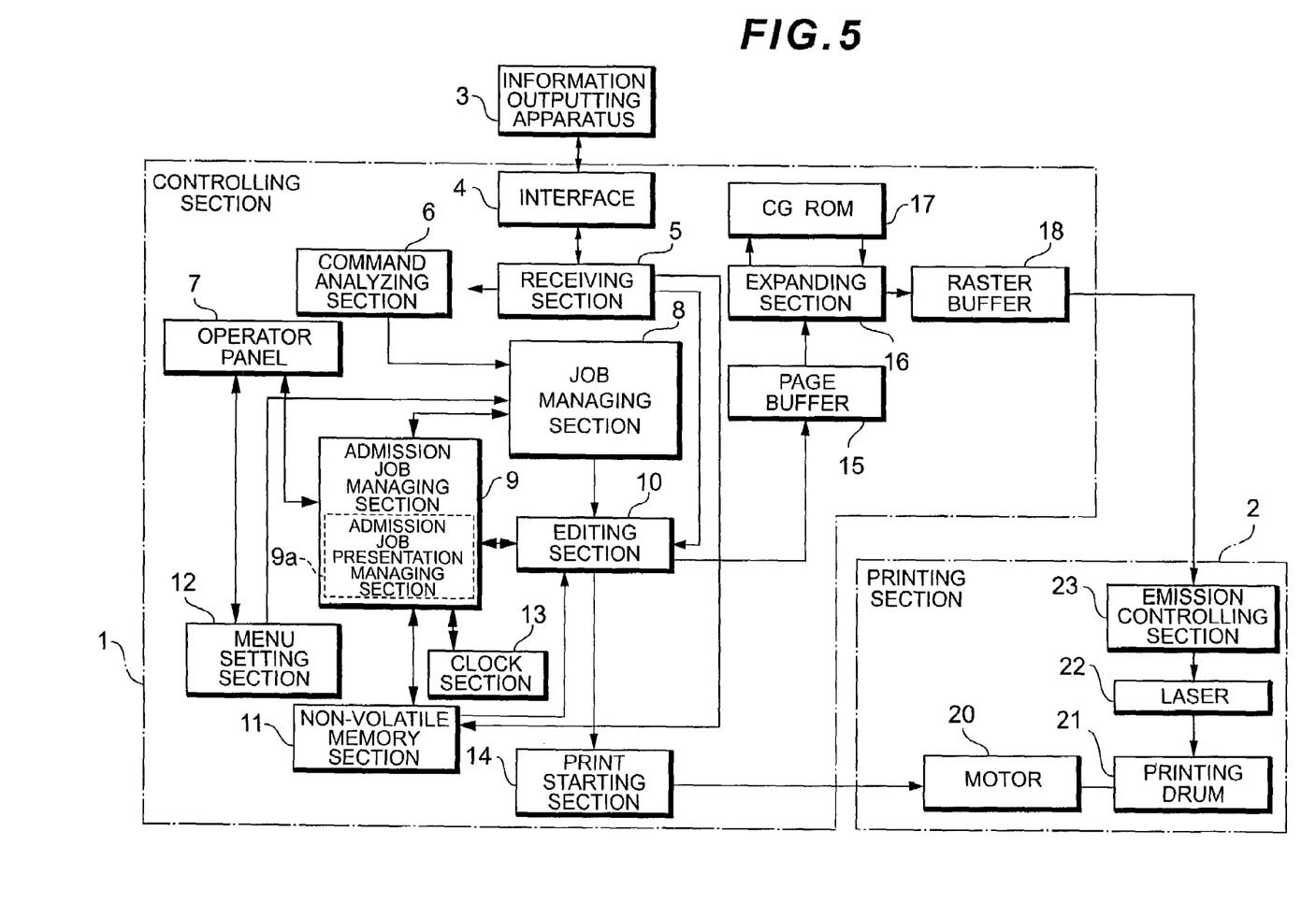
FIG. 5 is a block diagram showing a configuration of a printing apparatus of Embodiment 2.

FIG. 5 is a block diagram showing a configuration of a printing apparatus of Embodiment 2. An element of the printing apparatus of Embodiment 2 which is different from the printing apparatus of Embodiment 1, is an admission job presentation managing section (admission information presentation managing section) 9A which is provided to the admission job managing section 9. This admission job presentation managing section 9A has a function to judge whether the admission job can be presented an operator panel 7 or not and to present the admission job only in the case where it judged that the admission job can be presented. Therefore, the same elements which are common with the Embodiment 1 mentioned above, are not described. And, a function of the admission job presentation managing section 9A will be described.

The admission job managing section 9 is connected with the operator panel 7. And, in case where presentation of admission job is requested by an operation at the operator panel 7, the admission job managing section 9 obtains the present time from a clock section 13 which is connected with the admission job presentation managing section 9A. And, the admission job presentation managing section 9A compares the obtained present time with the assigned time for printing of the admission job. Thereby, it is judged whether the present time is the time assigned for printing when the admission job can be presented at the operator panel 7 or not. Here, in case where the present time is the time assigned for printing when the admission job can be presented, the admission job managing section 9 obtains the corresponding admission job name from the admission job information, so as to send the corresponding admission job name to the operator panel 7. And, the admission job name is presented at the operator panel 7. Thereby, any third party cannot detect the existence of the admission job, because the admission job names are presented at the operator panel 7 only at the time assigned for printing which is known only by the user.

<Operation>

The overall flow of the admission job process in Embodiment 2 is same as what is shown in the flow chart of FIG. 2. So, the description is omitted. Moreover, the flow of the admission job receiving process in Embodiment 2 is same as what is shown in the flow chart of FIG. 3. So, the description is omitted. Further, the overall flow of the admission job printing process in Embodiment 2 is same as what is shown in the flow chart of FIG. 4. So, the description is omitted. However, in Embodiment 2, the method of selecting admission job information by the operator panel 7 of STEP S21 in FIG. 2 is specific. So, the method of selecting admission job will be described, referring to FIG. 6.

Figure 6:
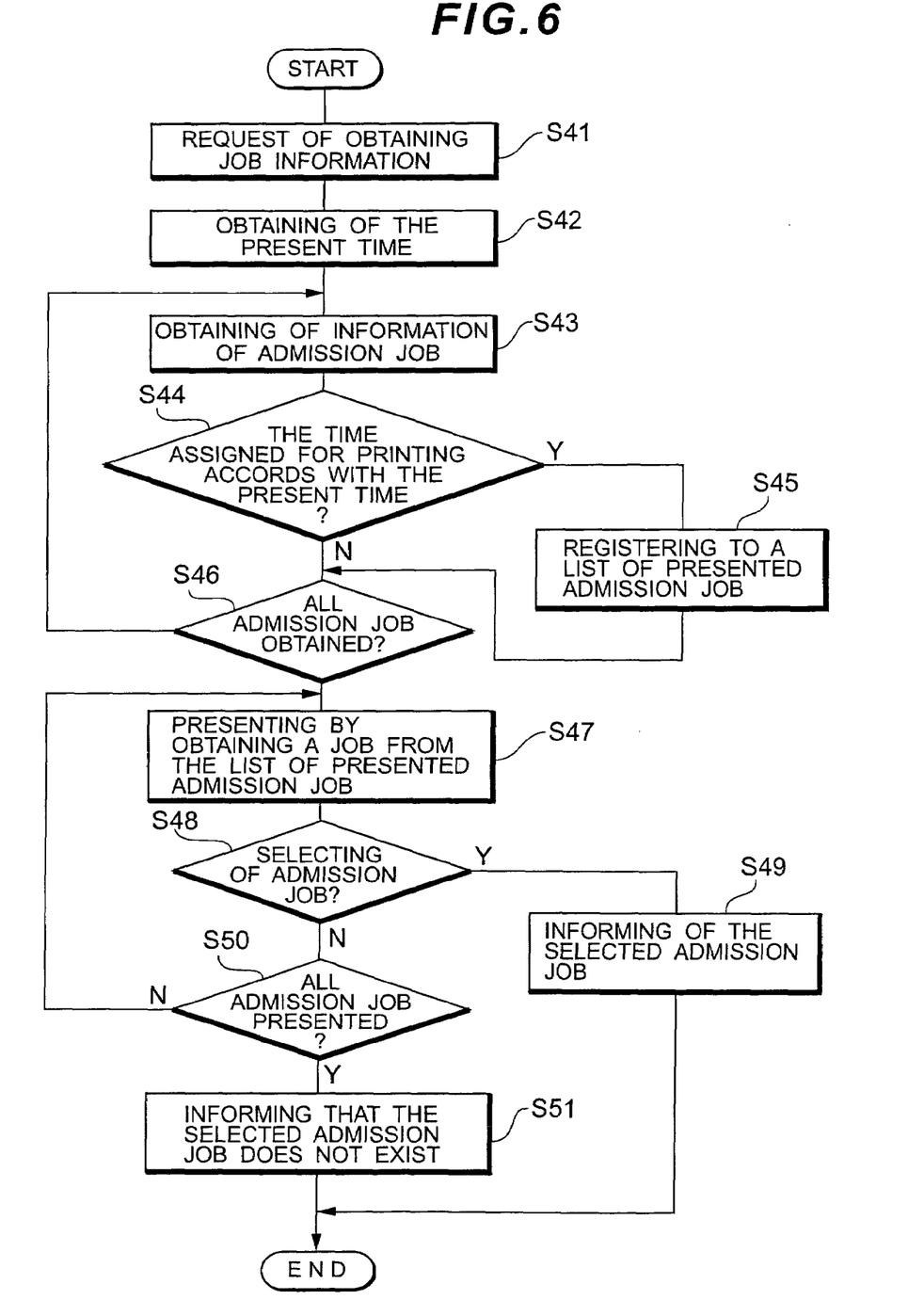
FIG. 6 is a flow chart showing a flow of admission job selecting process of Embodiment 2.

FIG. 6 is a flow chart showing a flow of admission job selecting process of Embodiment 2. That is, FIG. 6 is a flow chart showing a flow of admission job selecting process in STEP S21 of FIG. 4 in detail. First of all, the operator panel 7 puts out a request of obtaining an admission job to the admission job managing section 9 (STEP S41). Then, the admission job managing section 9 obtains the present time from the clock section 13, so that the job presentation managing section 9A generates a list of admission job which can be presented at the present time (STEP S42).

Subsequently, the admission job managing section 9 obtains admission job information contained in the non-volatile memory section 11 (STEP S43). Further, the admission job managing section 9 compares the present time obtained at STEP S42 with the assigned time for printing of the admission job information obtained at STEP S43 (STEP S44). And, as a result of comparison, in case where the present time accords with the assigned time (in case of YES at STEP S44), the admission job managing section 9 registers to a registering list the admission job which can be presented (STEP S45).

On the other hand, in case where the present time does not accord with the assigned time (in case of NO at STEP S44), whether all the admission jobs are obtained from the non-volatile memory section 11 is judged (STEP S46). Here, in case where all the admission job are not obtained (in case of NO at STEP S46), the process returns to STEP S43, so as to repeat the steps mentioned above until all the admission jobs are read out. On the other hand, in case where all the admission job are obtained (in case of YES at STEP S46), the operator panel 7 presents a desired admission job obtained from the list of all the admission jobs which are obtained from the admission job managing section 9 (STEP S47).

Subsequently, the operator panel 7 judges whether the presented admission job is selected by an operation of a user or not (STEP S48). In case where the presented admission job is selected by an operation of a user (in case of YES at STEP S48), the operator panel 7 informs the admission job managing section 9 of the selected admission job (STEP S49). Then, the process of selecting job information ends. On the other hand, in case where the presented admission job is not selected by an operation of a user, that is, in case where the user wants to present the other admission job (in case of NO at STEP S48), the operator panel 7 judges whether all the admission jobs have been presented or not (STEP S50).

Here, in case where all the admission jobs have not been presented (in case of NO at STEP S50), the process returns to STEP S47, so as to repeat the steps mentioned above until all the admission jobs are presented. On the other hand, in case where all the admission jobs have been presented (in case of YES at STEP S50), the operator panel informs the admission job managing section 9 that the corresponding job has not been selected (STEP S51). Then, the process ends.

<Effects>

In a printing apparatus of Embodiment 1, an illegal printing might be performed when passwords and assigned times for printing happened to accord with each other, in case where a third party continuously inputted or sent a password, because the third party can detect existence of a job which needs admission (that is, admission job). However, in a printing apparatus of Embodiment 2, a third party cannot detect existence of a job, because the admission jobs are not presented until the time which only the user knows comes. Therefore, an illegal printing might not be performed by the third party, because the third party cannot detect the admission job to perform a continuous illegal access. And, security of secret of printing information by a printing apparatus can increase.

Embodiment 3

In a printing apparatus in Embodiment 1 and 2 mentioned above, if the user who contained the admission job forgets the assigned time for printing, the user cannot print unless the user send the admission job again when the user prints the admission job. Therefore, in Embodiment 3, to avoid this inconvenience, when the present time came to the assigned time for printing, or when the present time came to several minutes before the assigned time for printing, the user who sent the admission job is informed that the present time came to the assigned time for printing, or that the present time came to several minutes before the assigned time for printing. Thereby, the user can perform printing at the assigned time for printing, even if the user forgot the assigned time for printing.

<Configuration>

Figure 7:
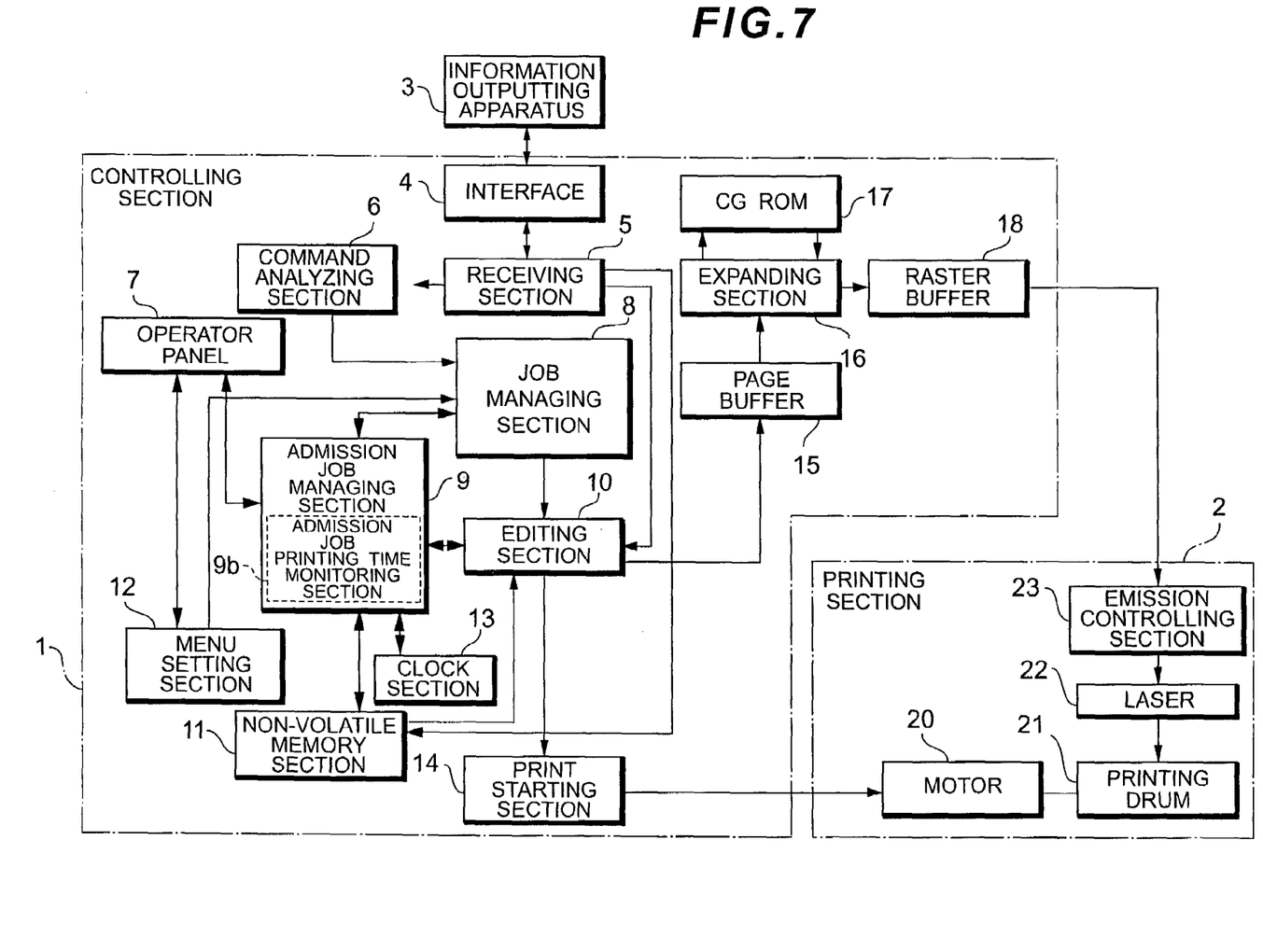
FIG. 7 is a block diagram showing a configuration of a printing apparatus of Embodiment 3.

FIG. 7 is a block diagram showing a configuration of a printing apparatus of Embodiment 3. An element of the printing apparatus of Embodiment 3 which is different from the printing apparatus of Embodiment 1, is an admission job printing time monitoring section (printing time monitoring section) 9B which is provided to the admission job managing section 9. This admission job printing time monitoring section 9B has a function to inform the information outputting apparatus 3 that the present time has come to the assigned time for printing, or that the present time has come to several minutes before the assigned time for printing; when the present time has come to the assigned time for printing, or when the present time has come to several minutes before the assigned time for printing.

That is, in an apparatus of Embodiment 3, the admission job printing time monitoring section 9B provided to the admission job managing section 9 constantly monitors the assigned time for printing by comparing the assigned time for printing of the admission job contained in the non-volatile memory section 11 with the present time obtained from the clock section 13. And, when the present time has come to the assigned time for printing, or when the present time has come near to the assigned time for printing, the admission job managing section 9 informs a host device (that is, the information outputting apparatus 3) via the interface 4 that the present time has come to the assigned time for printing, or that the present time has come near to the assigned time for printing. Thereby, the user can perform printing at the assigned time for printing without fail, even if the user cannot remember the assigned time for printing.

<Operation>

The overall flow of the admission job process in Embodiment 3 is same as what is shown in the flow chart of FIG. 2. So, the same description is omitted. However, in Embodiment 3, the detailed flow of the admission job receiving process at at STEP S1 in FIG. 2 is different from what is shown in the flow chart of FIG. 3 of Embodiment 1 and 2. So, the detailed flow of the admission job receiving process will be described referring to FIG. 8. Incidentally, the detailed flow of the admission job printing process in Embodiment 2 is same as what is shown in the flow chart of FIG. 4. So, the same description is omitted.

Figure 8:
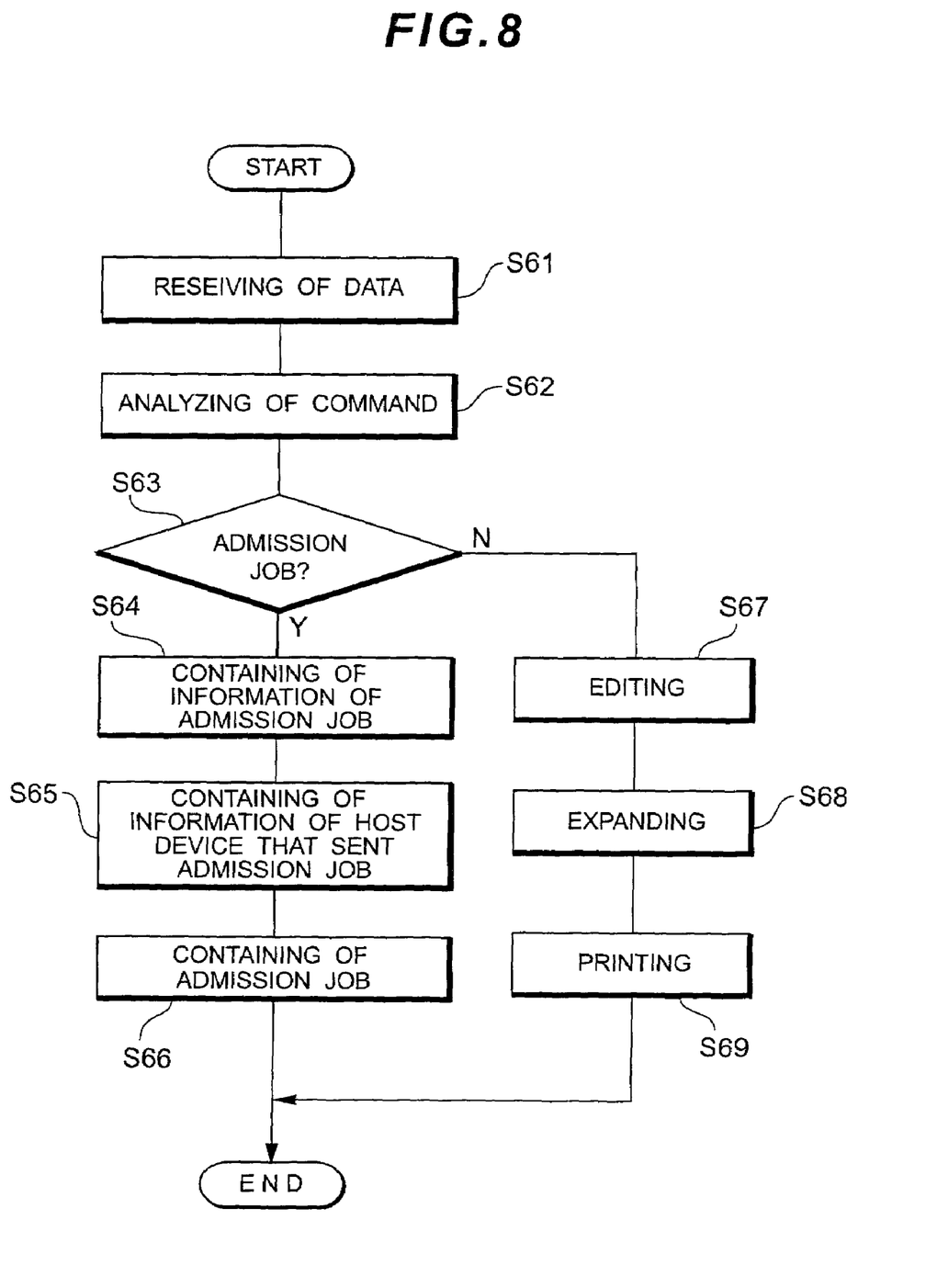
FIG. 8 is a flow chart showing in detail a flow of admission job receiving process of Embodiment 3 at STEP S1 in FIG. 2.

FIG. 8 is a flow chart showing in detail a flow of admission job receiving process in Embodiment 3 at STEP S1 in FIG. 2. In FIG. 8, at first, a receiving buffer 5 of a printing apparatus receives via an interface 4 a printing data sent from an information outputting apparatus 3 such as a personal computer etc. (STEP S61). Subsequently, a command analyzing section 6 analyzes a command of job information. And, the job information is sent to a job managing section 8 (STEP S62). Then, the job managing section 8 judges whether the received job information is an admission job or not (STEP S63).

Here, in case where the received job information is an admission job (in case of YES at STEP S63), the job managing section 8 informs an admission job managing section 9 of the job information obtained from the command analyzing section 6, that is, admission job information. Then, the admission job managing section 9 contains the admission job information including a name of the job, a password, a time of printing etc. in the non-volatile memory section 11 (STEP S64). Further, the admission job managing section 9 contains in the non-volatile memory section 11 the information such as an interface name, IP address, a mail address etc. of the host apparatus (that is, the information outputting apparatus 3) which has sent the admission job information (STEP S65), after the admission job managing section 9 obtains the information. Subsequently, the admission job managing section 9 puts out an indication to the non-volatile memory section 11, so as to contain the printing data of the admission job. Thereby, the non-volatile memory section 11 contains the printing data in itself, after it read out the printing data from the receiving buffer 5 (STEP S66). Incidentally, the non-volatile memory to contain a printing data, is not limited to HDD (Hard Disk Drive) or flash memory etc.

On the other hand, in case where the received job information is not an admission job at STEP S63 (in case of NO at STEP S63), an editing section 10 edits a printing data received at the receiving buffer 5 so as to make an intermediate data based on the job information obtained from the job managing section 8. Then, the intermediate data is sent to a page buffer 15 (STEP S67). Further, an expanding section 16 expands the edited intermediate data to a raster image data via a page buffer 15. Then, the expanded raster image data is contained in a raster buffer 18 (STEP S68). And, the printing section 2 performs a printing process after it received the raster image data given from the raster buffer 18 (STEP S69).

Figure 9:
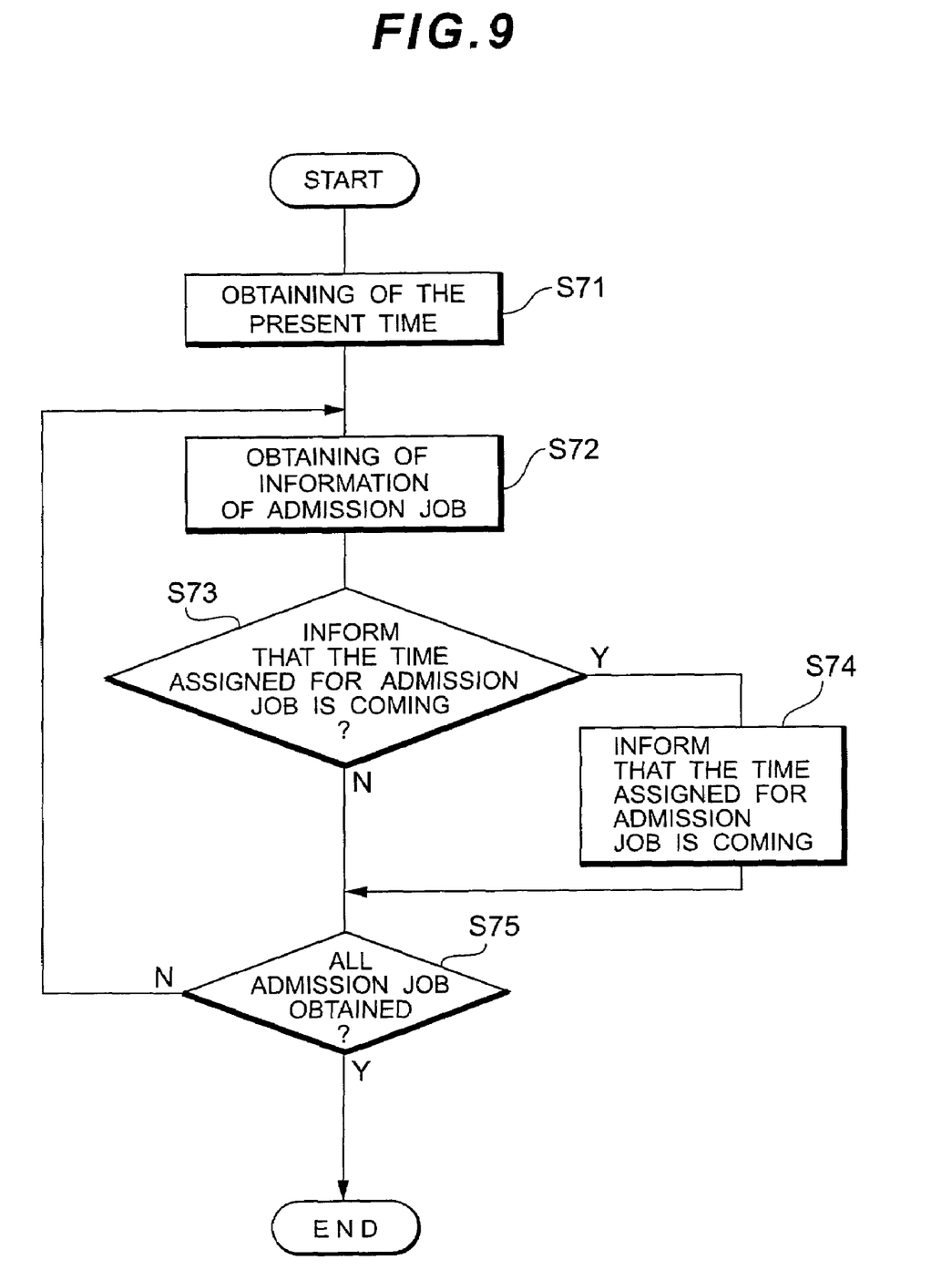
FIG. 9 is a flow chart showing in detail a flow of printing time monitoring process of admission job of Embodiment 3.

FIG. 9 is a flow chart showing in detail a flow of printing time monitoring process of admission job of Embodiment 3. Hereinafter, referring to FIG. 9, a flow of printing time monitoring process of admission job will be described. First of all, the admission job printing time monitoring section 9B provided at the admission job managing section 9 operates periodically. Then, it obtains the present time from the clock section 13, so as to whether there is any admission job which is coming near to the present time (STEP S71). Subsequently, the admission job managing section 9 obtains admission job information contained in the non-volatile memory section 11 (STEP S72). Further, the admission job managing section 9 compares the present time obtained at STEP S71 with the assigned time for printing of the admission job information obtained at STEP S72 (STEP S73). And, the admission job managing section 9 judges whether it is necessary to inform that the assigned time for printing is coming near to the present time (STEP S73).

Here, in case where it is necessary to inform that the assigned time for printing is coming near to the present time (in case of YES at STEP S73), the admission job managing section 9 reads out the information of the host apparatus (information outputting apparatus 3) from the non-volatile memory section 11. And, it informs the host apparatus (information outputting apparatus 3) which has sent the corresponding admission job, via the interface 4, that the assigned time for printing is coming near to the present time (STEP S74). On the other hand, in case where it is not necessary to inform that the assigned time for printing is coming near to the present time (in case of NO at STEP S73), whether all the admission jobs are read out from the non-volatile memory section 11 or not, is judged (STEP S75). Here, in case where all the admission job are read out (in case of YES at STEP S75), the process of monitoring printing time of the admission job, ends. Moreover, in case where all the admission job are not read out (in case of NO at STEP S75), the process returns to STEP S72, so as to repeat the steps mentioned above until all the admission jobs are read out.

<Effects>

As described above, according to the printing apparatus of Embodiment 3, the user is able to perform printing process at the assigned time, without sending the admission job again in case where the user forgot the assigned time, because the user is informed that the present time is coming near to the assigned time. Thereby, a printing apparatus which is easy to operate can be realized, because the user can avoid a duplicate operation of sending the same admission job again in case where the user forgot the assigned time for printing.

Embodiment 4

<Configuration>

In a printing apparatus in Embodiment 3 mentioned above, if the user who contained the admission job forgot or if the user had the other job which is more important than the print job at the assigned time for printing, the present time passes by the assigned time for printing. Then, the corresponding admission job is deleted. So, the user cannot print unless the user send the same admission job again. As a result, there is an inconvenience it needs much labor to perform printing. Therefore, in a printing apparatus of Embodiment 4, even if the assigned time for printing past by the present time, the user who sent the admission job is informed that the assigned time for printing past by the present time and the user is asked if the assigned time for printing should be set again, before the admission job is deleted. Thereby, the user can perform printing without sending again the same admission job whose assigned time has past, because user can set again a new assigned time for printing, by the user's intention. Therefore, a printing process performed by an admission job whose assigned time has past can be rapidly performed.

<Configuration>

Figure 10:
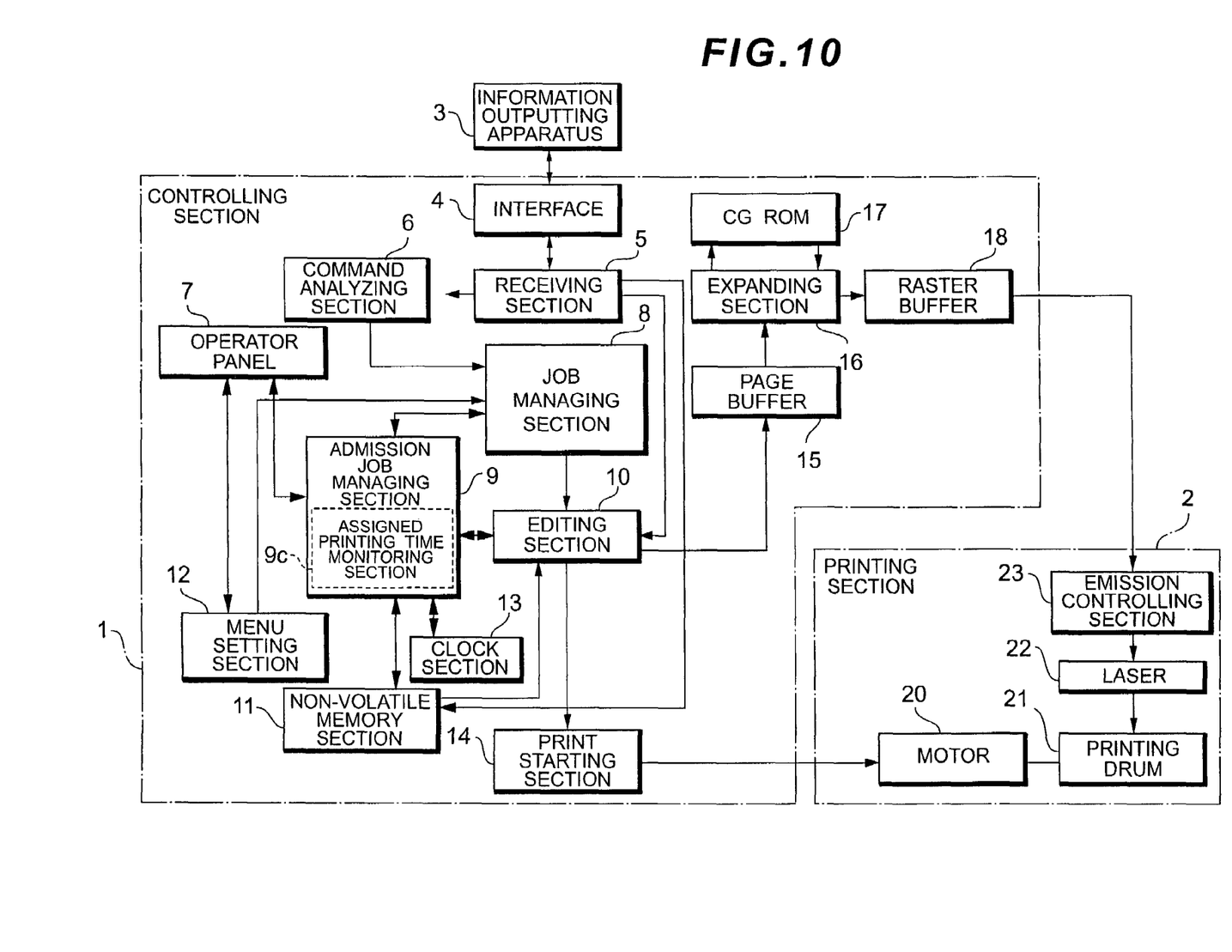
FIG. 10 is a block diagram showing a configuration of a printing apparatus of Embodiment 4.

FIG. 10 is a block diagram showing a configuration of a printing apparatus of Embodiment 4. An element of the printing apparatus of Embodiment 3 which is different from the printing apparatus of Embodiment 1, is a job past the assigned printing time monitoring section 9C which is provided to the admission job managing section 9. This job past the assigned printing time monitoring section (past the assigned printing time monitoring section) 9C constantly monitors whether the assigned time for printing has past, by comparing the assigned time for printing of the admission job contained in the non-volatile memory section 11 with the present time obtained from the clock section 13. And, when the assigned time for printing has past, the admission job managing section 9 asks a host device (information outputting apparatus 3) via a interface 4 whether the user will set again the assigned time for printing, or not. Thereby, the user can perform printing without sending again the same admission job, even if the user overlooked the assigned time for printing.

<Operation>

The overall flow of the admission job process in Embodiment 4 is same as what is shown in the flow chart of FIG. 2. So, the same description is omitted. Moreover, the detailed flow of the admission job receiving process in Embodiment 4 is same as what is shown in the flow chart of FIG. 8 in Embodiment 3. And, the detailed flow of the admission job printing process in Embodiment 4 is same as what is shown in the flow chart of FIG. 4 in Embodiment 1. So, the same description is omitted.

Figure 11:
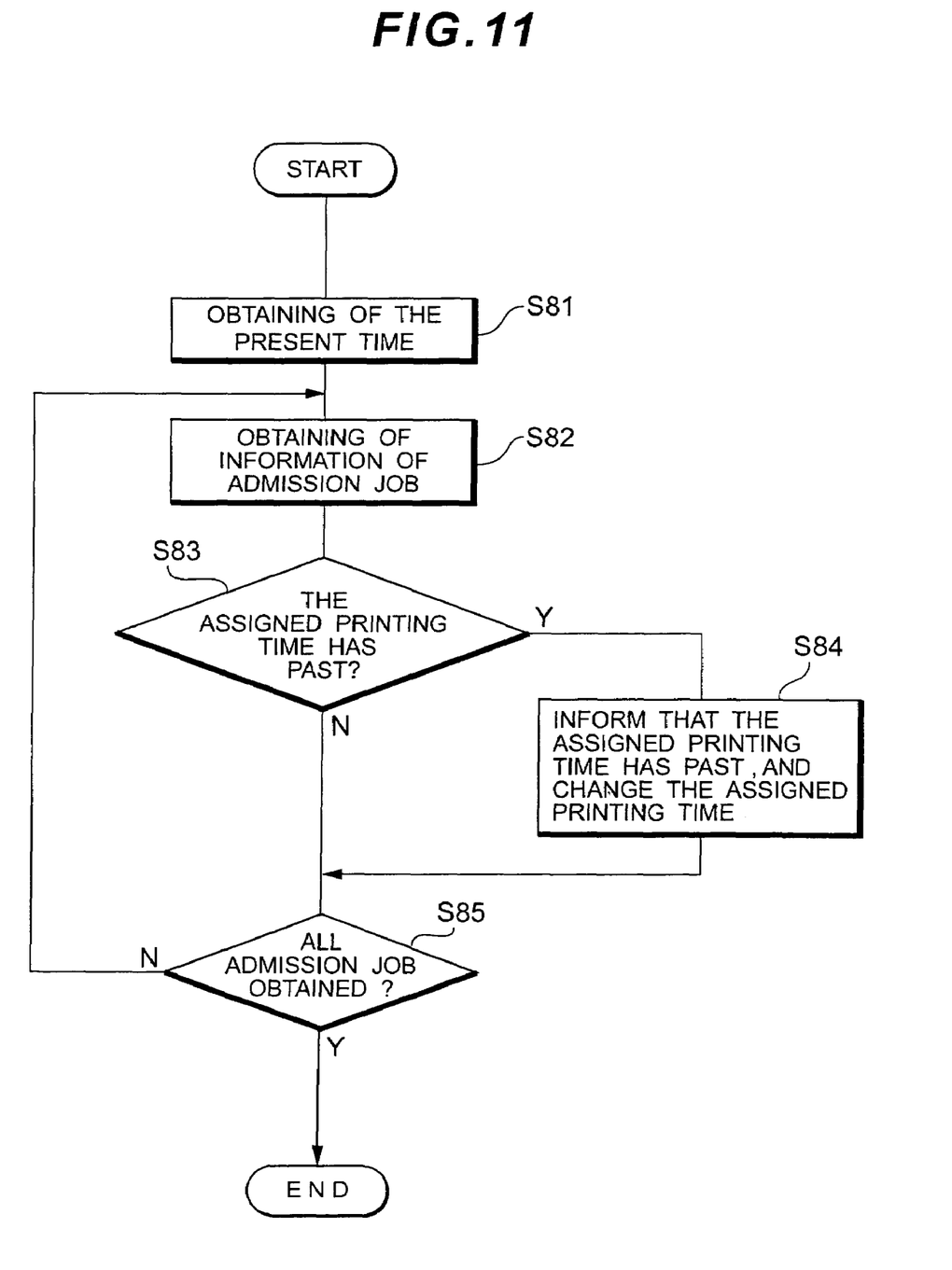
FIG. 11 is a flow chart showing in detail a flow of monitoring process of admission job that has past an assigned printing time of Embodiment 4.

Subsequently, a flow of the process of monitoring the admission job whose assigned time for printing has past in Embodiment 4 will be described. FIG. 11 is a flow chart showing in detail a flow of admission job monitoring process in Embodiment 4. First of all, the job past the assigned printing time monitoring section 9C provided at the admission job managing section 9 operates periodically. Then, it obtains the present time from the clock section 13, so as to whether there is any admission job whose assigned time for printing has past (STEP S81). Subsequently, the admission job managing section 9 obtains admission job information contained in the non-volatile memory section 11 (STEP S82). Further, the admission job managing section 9 compares the present time obtained at STEP S81 with the assigned time for printing of the admission job information obtained at STEP S82 (STEP S83). And, the admission job managing section 9 judges whether there is any admission job whose assigned time for printing has past (STEP S83).

Here, in case where there is an admission job whose assigned time for printing has past (in case of YES at STEP S83), the admission job managing section 9 reads out the information of the host apparatus from the non-volatile memory section 11. And, it informs the host apparatus (information outputting apparatus 3) which has sent the corresponding admission job, via the interface 4, that the assigned time for printing has past. And, in case where the admission job managing section 9 received a command from the host apparatus (information outputting apparatus 3) via the interface 4 and the receiving buffer 5, the admission job managing section 9 changes the assigned time for printing contained in the non-volatile memory section 11 to the assigned time for printing newly assigned (STEP S84).

On the other hand, in case where there is not any admission job whose assigned time for printing has past (in case of NO at STEP S83), whether all the admission jobs are read out from the non-volatile memory section 11 or not, is judged (STEP S85). Here, in case where all the admission job are read out (in case of YES at STEP S85), the process of monitoring printing time of the admission job, ends. Moreover, in case where all the admission job are not read out (in case of NO at STEP S85), the process returns to STEP S82, so as to repeat the steps mentioned above until all the admission jobs are read out.

<Effects>

As described above, according to the printing apparatus of Embodiment 4, the user is able to change the assigned time for printing by the user's intention from the host apparatus by informing the host apparatus that the assigned time for printing has past. Thereby, a process of sending again the same admission job whose assigned time for printing has past. Therefore, a printing process performed by the admission job whose assigned time for printing has past, can be rapidly performed.

Incidentally, the function of changing the assigned printing time, performed by the admission information managing section in Embodiment 4; can be applied to either of Embodiment 1, 2, 3.

Other Embodiments

In Embodiments 1 to 4, a case of inputting an admission data such as a password etc. by an operation at an operator panel of a printing apparatus, has been described. However, the present invention is not limited to these embodiments. That is, an admission data such as a password etc. can be inputted not only from the operator panel but also by a command indicating an admission data such as a password or from MIB (Management Information Base), or from Web etc. Moreover, in case of judging whether the present time accords with the time assigned for printing, a certain extent of difference of time can be allowed. For example, a time interval from a time of n seconds before the assigned time to a time of m seconds after the assigned time, a time interval from a time of n minutes before the assigned time to a time of m minutes after the assigned time, or a time interval from a time of n hours before the assigned time to a time of m hours after the assigned time can be regarded as the assigned time. Further, a menu command for setting these times can be provided.

Moreover, the non-volatile memory section can be any other memory media such as HDD, a flash memory etc. Incidentally, on condition that admission jobs are valid only in case where the printing apparatus is turned on, a volatile memory such as RAM etc. can be adopted. Moreover, in Embodiment 1 to 4 mentioned above, a case of a printer has been described. However, the present invention can be applied to other printing apparatuses such as FAX, MFP (Multi-Function Printer), a copy machine etc. Moreover, the present time was obtained from a clock section in the printing apparatus, in Embodiments mentioned above. However, the printing apparatus can be made so that the present time can be obtained from an outer apparatus via the interface.

What is claimed is:

1. A printing apparatus having a function of admitting a printing process based on a piece of information inputted to admit printing; wherein the printing apparatus comprising:
    a memory section for memorizing plural printing data, and for memorizing an admission information and an assigned printing time corresponding to each of said plural printing data;
    a clock section for obtaining a present time;
    an admission information inputting section for inputting an admission information corresponding to a prescribed printing data;
    an admission information managing section for outputting a command of indicating to perform a printing process of a prescribed print data contained in said memory section, in case where an admission information inputted by said admission information inputting section accords with said admission information corresponding to said prescribed print data, and where the present time obtained from said clock section accords with said assigned printing time corresponding to said prescribed print data; and
    a print processing section for performing a printing process based on said command outputted from said admission information managing section.

2. A printing apparatus according to claim 1 comprising:
    a presenting section for presenting existence of print data in said memory section;
    wherein said admission information managing section comprising:
    an admission information presentation managing section for restricting presentation of existence of print data, based on said assigned printing time corresponding to each of said print data and the present time obtained from said clock section.

3. A printing apparatus according to claim 1 wherein said admission information managing section comprising:
    a printing time monitoring section for informing an outer apparatus that the present time obtained from said clock section has come near said assigned printing time or has reached to said assigned printing time.

4. A printing apparatus according to claim 3 wherein said admission information managing section changes said assigned printing time.

5. A printing apparatus according to claim 1 wherein said admission information managing section deletes said print data including said admission information, when the present time obtained from said clock section has past said assigned printing time.

6. A printing apparatus according to claim 5 wherein said admission information managing section comprising:

an assigned printing time monitoring section for informing an outer apparatus that the present time obtained from said clock section has past said assigned printing time, at prescribed time before said print data including said admission information is deleted.

7. A printing apparatus according to claim 6 wherein said admission information managing section changes said assigned printing time.

8. A printing apparatus according to claim 1 wherein said admission information managing section changes said assigned printing time.

9. A print processing method for admitting a printing process based on a piece of information inputted to admit printing; wherein the print processing method comprising steps of:

memorizing plural printing data, and an admission information and an assigned printing time corresponding to each of said plural printing data;

obtaining a present time from a clock section;

inputting an admission information corresponding to a prescribed printing data;

outputting a command of indicating to perform a printing process of a prescribed print data contained in a memory section, in case where an admission information inputted by said admission information inputting section accords with said admission information corresponding to said prescribed print data, and where the present time obtained from said clock section accords with said assigned printing time corresponding to said prescribed print data; and performing a printing process based on said command.

10. A print processing method according to claim 9 further comprising steps of:

presenting existence of said print data;

and restricting presentation of existence of said print data, based on said assigned printing time corresponding to each of said print data and the present time obtained from said clock section.

11. A print processing method according to claim 9 further comprising a step of:

informing an outer apparatus that the present time obtained from said clock section has come near said assigned printing time or has reached to said assigned printing time.

12. A print processing method according to claim 11 further comprising a step of:

changing said assigned printing time.

13. A print processing method according to claim 9 further comprising a step of:

deleting said admission information corresponding to said print data, when the present time obtained from said clock section has past said assigned printing time.

14. A print processing method according to claim 13 further comprising a step of:

informing an outer apparatus that the present time obtained from said clock section has past said assigned printing time, at a prescribed time before said admission information is deleted.

15. A print processing method according to claim 14 further comprising a step of:

changing said assigned printing time.

16. A print processing method according to claim 9 further comprising a step of:

changing said assigned printing time.

* * * * *